United States Patent [19]
Cui

[11] Patent Number: 6,017,010
[45] Date of Patent: Jan. 25, 2000

[54] HALF-BALL TYPE UNIVERSALLY MOVABLE TRIPOD HEAD

[76] Inventor: Hanping Cui, 1-813, Bldg. 6, Huoqiaobelli, Chongwen District, Beijing 100061, China

[21] Appl. No.: 09/043,803
[22] PCT Filed: Sep. 25, 1996
[86] PCT No.: PCT/CN96/00080
§ 371 Date: Mar. 25, 1998
§ 102(e) Date: Mar. 25, 1998
[87] PCT Pub. No.: WO97/12172
PCT Pub. Date: Apr. 3, 1997

[30] Foreign Application Priority Data

Sep. 26, 1995 [CN] China ................................. 95116433

[51] Int. Cl.[7] ................................................. A47F 5/00
[52] U.S. Cl. ........................... 248/288.31; 248/181.1; 248/288.51; 403/56; 403/90
[58] Field of Search ............... 248/288.31, 288.51, 248/278.1, 231.71, 183.1, 181.1, 125.1, 82; 403/90, 122, 362, 92, 53, 57, 56, 74

[56] References Cited

U.S. PATENT DOCUMENTS

| | | | |
|---|---|---|---|
| 2,459,676 | 1/1949 | Axtell | 248/177 |
| 2,464,500 | 3/1949 | Graham | 248/183 |
| 2,496,986 | 2/1950 | Coutant et al. | 248/181 |
| 2,650,788 | 9/1953 | Hulstein | 248/229 |

FOREIGN PATENT DOCUMENTS

| | | |
|---|---|---|
| 2196277 | 5/1995 | China . |
| 2581139 | 10/1986 | France . |
| 635871 | 9/1936 | Germany . |
| 1425957 | 3/1969 | Germany . |
| 3603981 | 7/1986 | Germany . |

Primary Examiner—Derek J. Berger
Assistant Examiner—Long Dinh Phan
Attorney, Agent, or Firm—Christie, Parker & Hale, LLP

[57] ABSTRACT

The half-ball type universally-movable tripod head for supporting cameras comprises a base (22), a platform (17) and a universally positioning means (23). The universally positioning means (23) comprises mainly an upper joint and a lower joint respectively having a half ball (3,4) with locking ball (1,2) in it and a socket (5,6), a supporting stand (15) between said two joints, a controlling handle (9), tension rods (7,8) having positive or negative thread respectively, and a nut (10) with positive and negative threads at opposite ends. The rod (7,8) is controlled by turning the handle (9) for tensioning or releasing the two half balls, so that the two joints can be locked or unlocked and the camera can be instantly immobilized as well as smoothly triaxially rotated.

3 Claims, 6 Drawing Sheets

HALF-BALL TYPE UNIVERSALLY MOVABLE TRIPOD HEAD

FIELD OF THE INVENTION

This invention relates to half-ball type universally moveable tripod head with double half-ball joints for connecting, for example, a camera to a support, which can be instantly immobilized at single point while rotating triaxially.

BACKGROUND OF THE INVENTION

In a prior tripod head, a tightening bolt and a controlling handle are provided in each of three axial directions of the tripod head respectively for adjusting and locating triaxially. So repeated adjustment of each controlling handle in three axial direction is necessary for arranging to choose an ideal image in photo-taking operation. In such a process, a photographer has to move his/her eyesight from cameral eye intermittently in order to adjust one of controlling handles repeatedly. This process is complicated and time-consuming, and often causes the photographer to miss a marvellous opportunity to take a photo, because it needs re-modifying a preceding located axial direction after the last axial direction has been selected. This is unadvantageous to grasp a determining instant, thus will miss an opportunity of creating an excellent work, in particular, during taking photos of news, sports, persons, stage and animals in which objects are in moving state. Moreover, the prior tripod head makes operation difficult because the long handle for each axial direction projects beyond the centre axis of the tripod head. It also makes it hard to distinguish in a hurry the direction that each handle controls. A further disadvantage of the prior tripod head is that long handles are easily to scratch clothing, make angular support fall, and are difficult in extension or retraction of the tripod head. Furthermore, since the radius of each clocked pivoting shaft is relatively small, the load capacity of general immobilization is correspondingly relatively small, and a great rotating force is accompanied with only a limited immobilizing and positioning capacity. To sum up, the prior tripod head needs complicated operation ,and can't be positioned quickly in an instant and its holding operation is unadaptable. Moreover, the prior tripod head has no function of horizonally rearward movement of gravity centre, and has small load capacity and is bulky, and has unsatisfactory reliability.

SUMMARY OF THE INVENTION

The object of the present invention is to provide a tripod head for overcoming the shortcomings of the prior tripod head which had to comprises a locking bolt and a long controlling handle in each of three axial directions respectively for obtaining a triaxially immobilized position. According to HUMAN ENGINEERING (ergonomics), the tripod head of the invention comprises a base, a platform, and a universally positioning means, wherein the universally positioning means comprises mainly an upper and a lower ball and an upper and a lower socket complementary to the balls, a support stand, a controlling handle, an upper and a lower locking balls, tension rods with positive or negative thread respectively and a nut with positive and negative threads at opposite ends. The double half-ball joints are designed like the form of human pelvis structure and joints between two hipbones. The two sockets of the tripod head are connected oppositely together by a support stand and form two large joints with said two half-balls. Each of half-balls can rotate freely about its vertical axis and sway at a certain angle in its corresponding socket. Upper and lower locking balls located in the pivoting centres of the upper and lower half-balls and provided within the upper and lower half-balls respectively may be connected together by the nut with positive and negative threads at opposite ends and the tension rods extending through the bottoms of upper and lower sockets. The nut with positive and negative threads and the controlling handle are all provided in the support stand between two sockets. The two locking balls can be tensioned or released by two tension rods through turning the controlling handle slightly, and thus be moved to or away from each other, so as to press together (or release) the contacting convex and concave surfaces of the two half-balls and the sockets to obtain a locked or unlocked state between the two half-balls. Therefore, the platform can sway within an angle of 200° in any direction and rotate for 360°, or can be locked securely. To sum up, the half-ball type universally moveable tripod head described above has the following advantages: the structure is reasonable and the operation is simple and convenient; the tripod head can be triaxially immobilized in an instant (for example in a second) when the photographer trails after for a picture-taking while holding the controlling handle by a single hand without moving his eyesight from cameral eye, thus being advantageous to grasp a determining instant view. The universally moveable tripod head according to the invention has an enhanced load capacity with big contact surfaces of the two large joints, and can be extended or retract conveniently. Moreover, the horizonally rearward movement of gravity centre of the tripod head can be realized so as to provide a great convenience for photo-taking with telephotolens. The tripod head according to the invention has an improved stability, so it works reliably within a long service life. It can generally be extensively applied to various fields such as photo-taking, operating a video camera, locating of medical apparatus, surveying or measuring with laser, and quick tracing and universal immobilization for all kinds of photology or science instruments.

BRIEF DESCRIPTION OF THE DRAWINGS

The half-ball type universally moveable tripod head according to the invention may best be understood by reference to the following description, taken in connection with the accompanying drawings.

DESCRIPTION OF THE PREFERED EMBODIMENT

Figure 1:
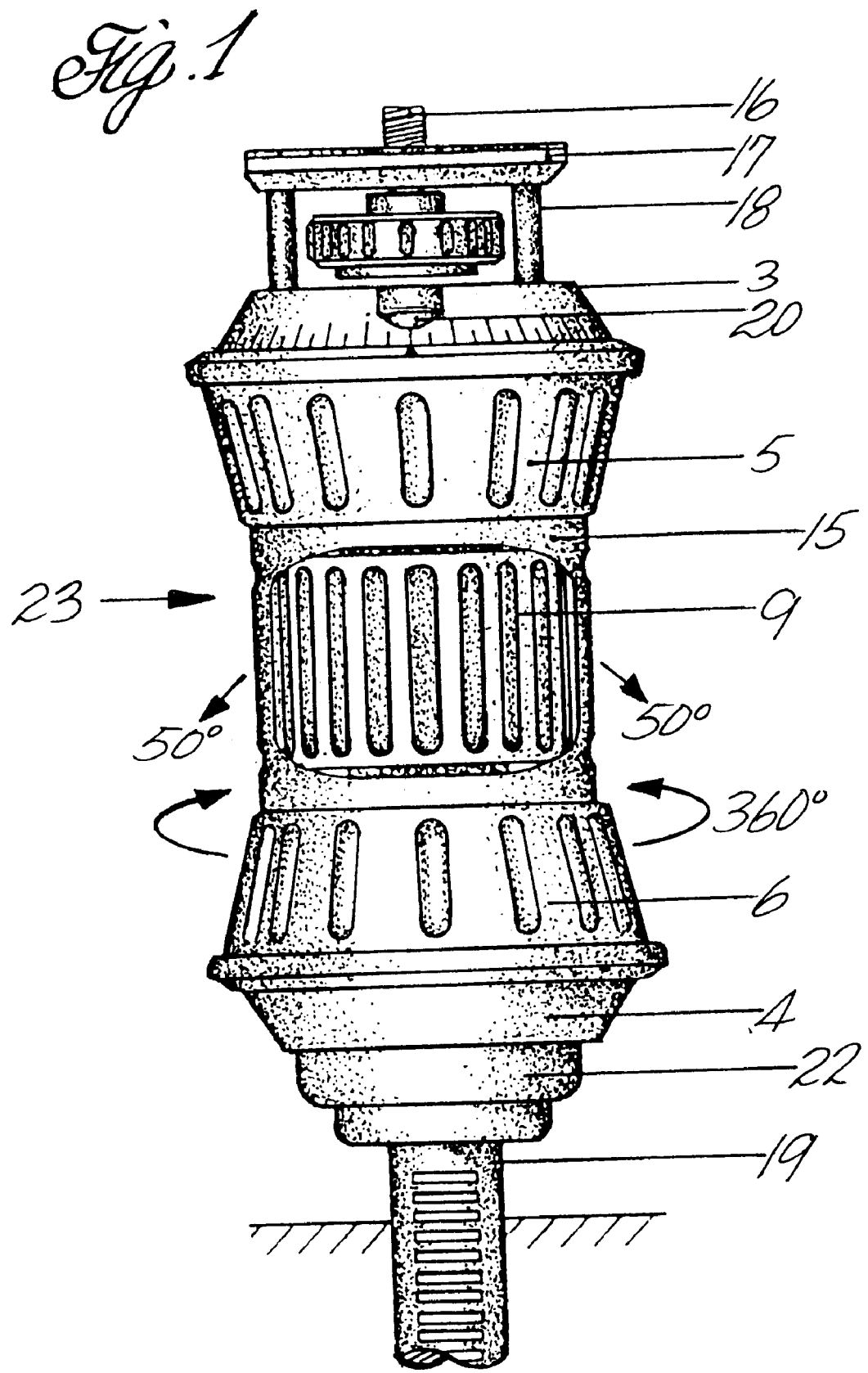
FIG. 1 is front view of the half-ball type universally moveable tripod head according to the invention.

Refering to FIG. 1~6, the reference numerals 13, 14 indicate respectively an upper and a lower short pin; 16—a bolt for securing the instrument, 18—a support for supporting a platform 17, 20—a bubble cell, and 21—a camera.

Figure 2:
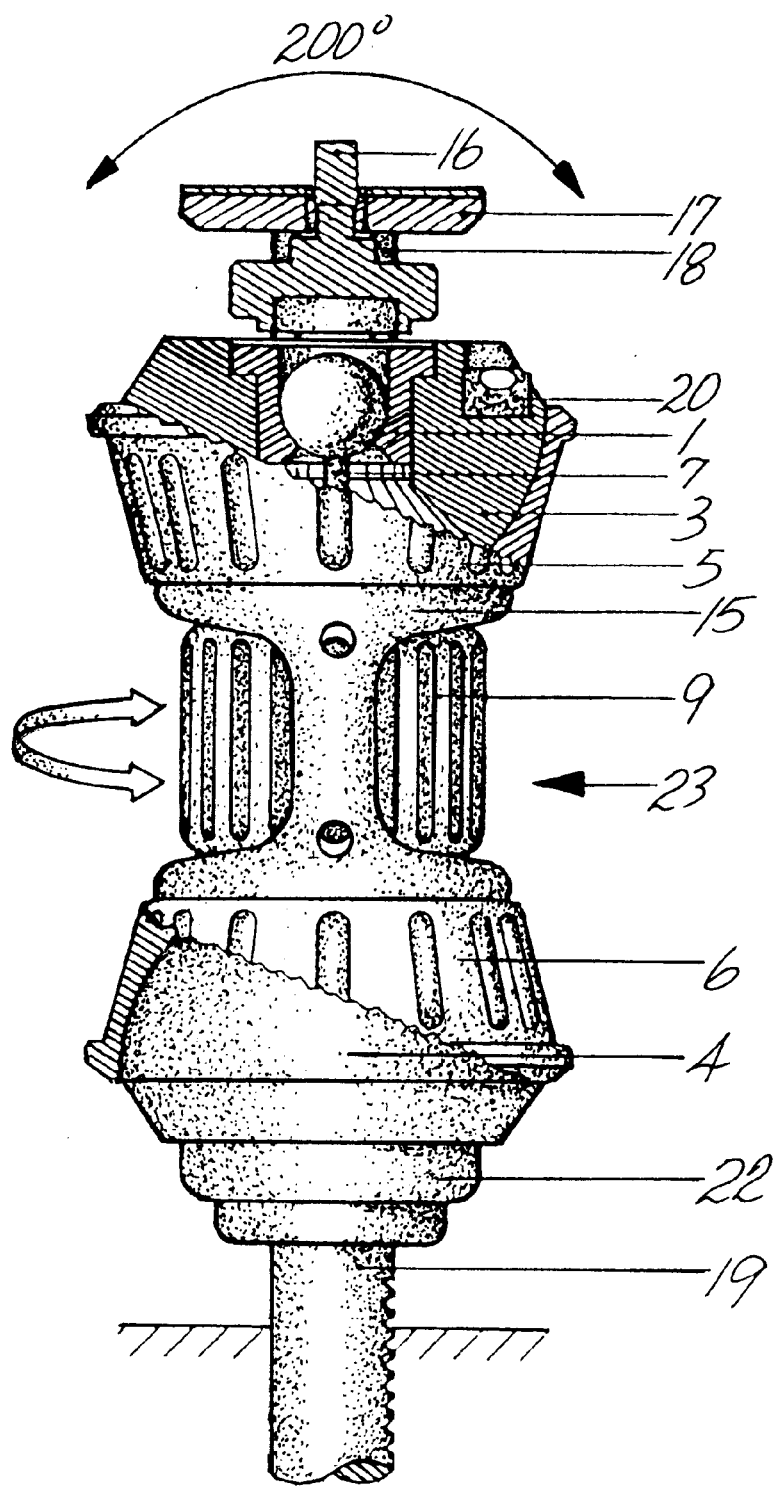
FIG. 2 is a partial sectional view of FIG. 1.
Figure 3:
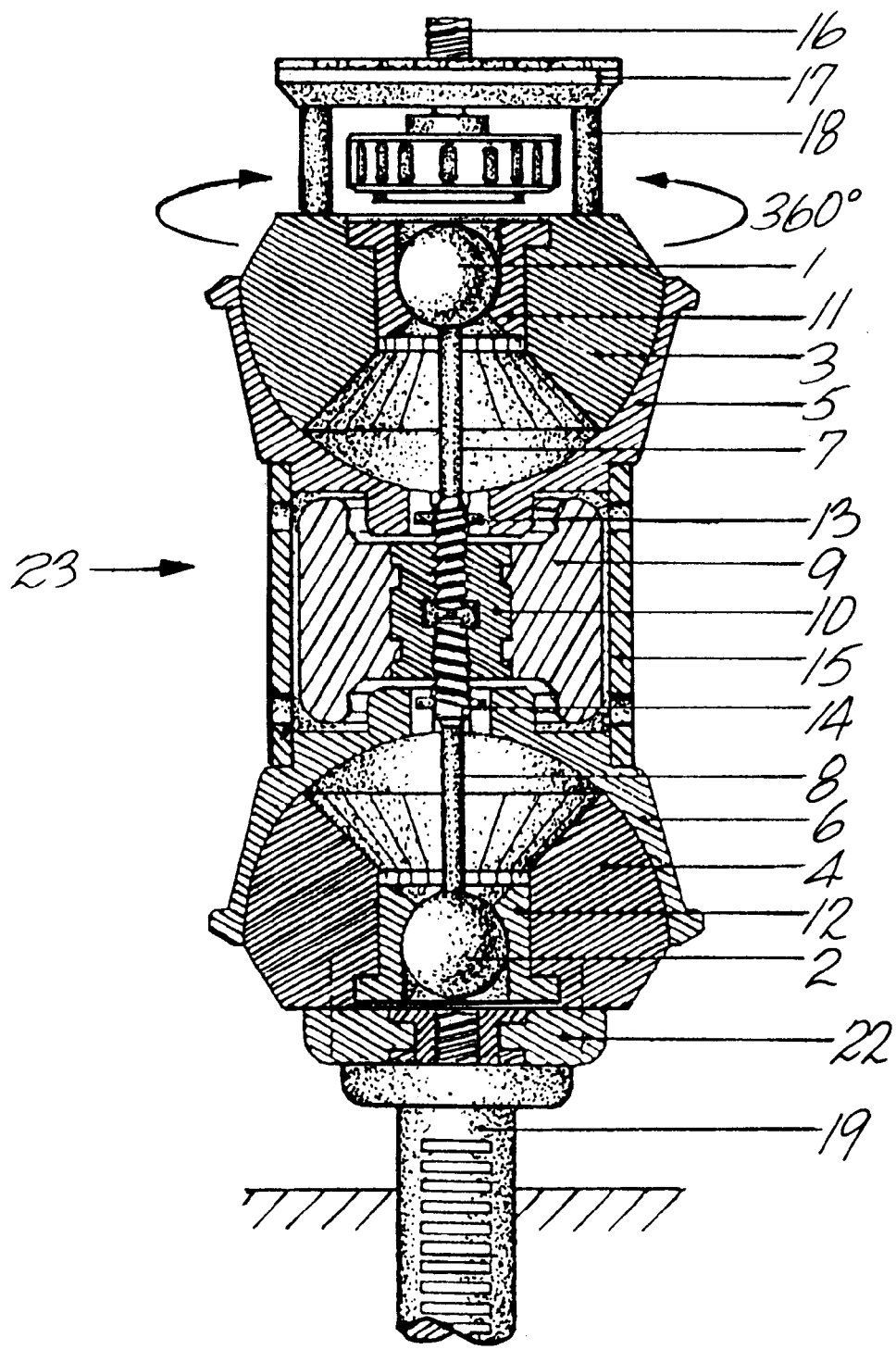
FIG. 3 is a side sectional view of FIG. 1.

As shown in FIG. 1 to FIG. 3, the half-ball type universally moveable tripod head according to the invention comprises a base 22, a platform 17 and a universally positioning means 23. The universally positioning means 23 comprises an upper and a lower half-ball 3, 4; an upper and a lower socket 5, 6 which engage with said half-balls; a support stand 15; coaxial controlling handle 9, an upper and a lower lockingball 1, 2, tension rods 7, 8 with positive or negative thread, and a nut 10 with positive and negative threads etc. The upper and lower half-balls 3, 4 may be made of light materials, such as nylon, Al-alloys or Mg-alloys etc., which are deformable to a certain extent so as to obtain adequate friction. The upper and lower sockets 5, 6 and support stand 15 may be made of Al-alloys or Mg-alloys as well. The upper and lower sockets 5, 6 are connected oppositely by the support stand 15 and form two large joints together with the two half-balls 3, 4, wherein the locking balls 1, 2 are located in the center of said two half-balls 3, 4 respectively, and further, a space is formed by removing partial ball body between the lower (or upper) portion and the center of the balls 3, 4 so that the half-balls 3, 4 can rotate for 360° about its vertical axis, and sway freely within a maxium angle of 200° in any direction.

The upper half part shown in FIG. 3 will be described hereafter. As shown in FIG. 3, a sleeve shape ball seating in which the locking ball 1 lies fits in a hole of the half-ball 2, wherein the inner diameter of the upper portion of the seating is slightly greater than that of locking ball ,and in the lower portion, the inner surface of said seating corresponds to part of the outer surface of said locking ball to act as a stop when locking. The ball seating may be made of copper etc.

The threaded tension rod 7, which can be made, for example, of steel, connects to the locking ball 1 by means of weld or other common means. In order to prevent the locking ball from co-rotating as the nut 10 is screwed, a lateral throughout hole, in which a short pin 13 is inserted, is provided at the end of the threaded part of the tension rod. When the short pin 13 locates in a lateral narrow slot provided at the end of the socket, the tension rod is prevented from rotating.

The nut 10 with positive and negative thread respectively at the opposite ends to engage with threaded tension rods which extend respectively through the bottoms of the upper and lower sockets 5, 6, may be made of copper, for example, and embedded in the handle 9 to form one piece or be integral with the handle as the handle 9 is initially produced. The handle 9 may be made of wood, nylon, or plastics etc. Besides, fine teeth may be carved in the outside surface of the handle to facilitate holding.

Moreover, as shown in FIG. 3, the sockets 5, 6 abut against the two ends of the support stand 15 with the collars thereof, therefore, the clamping force can be transferred to the support stand 15 to prevent the handle from the action of the clamping force.

Figure 4:
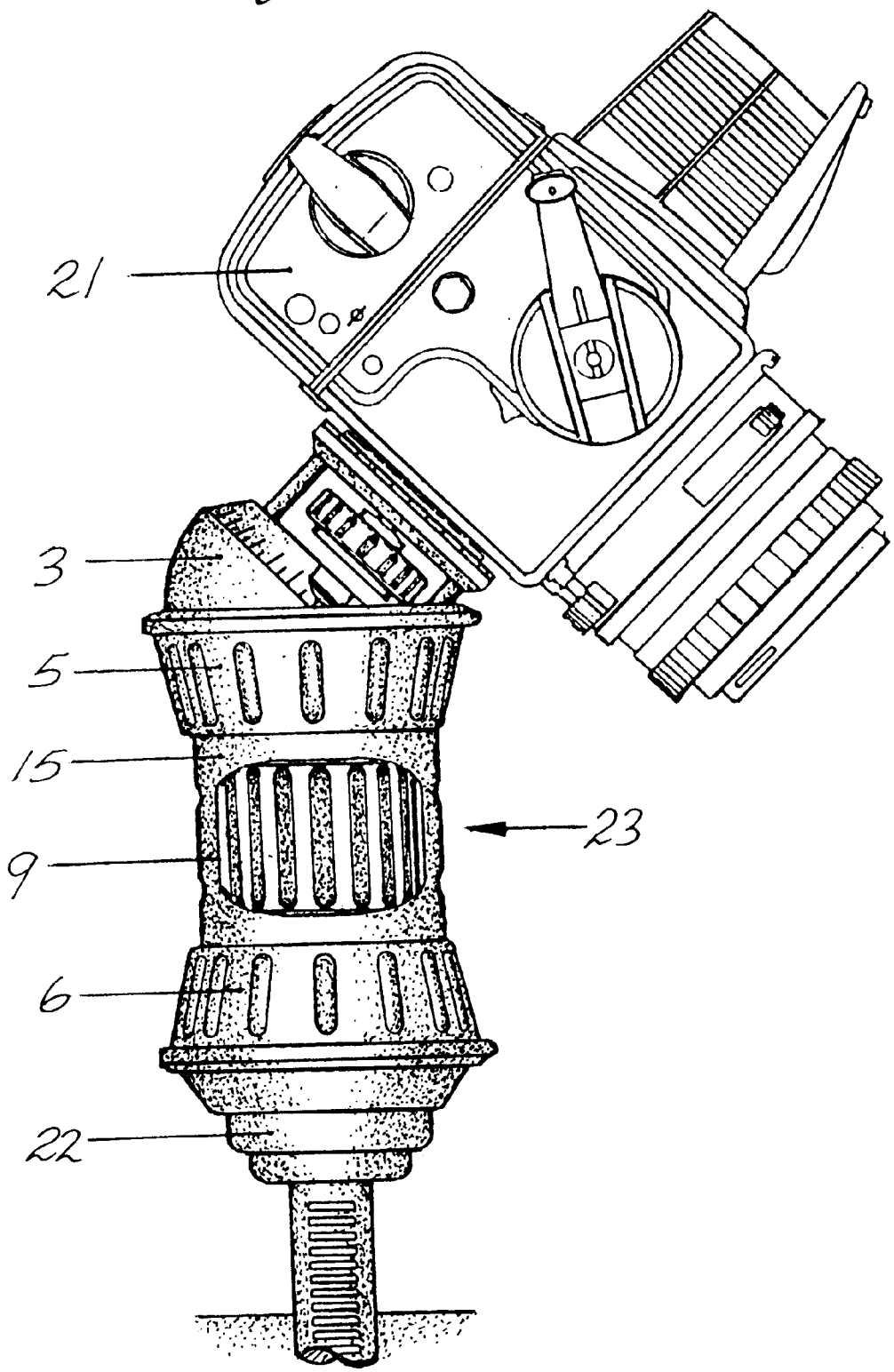
FIG. 4 is a view showing the operating state of the tripod head of the invention with the platform of the invention swaying to right at an angle of 45°.
Figure 5:
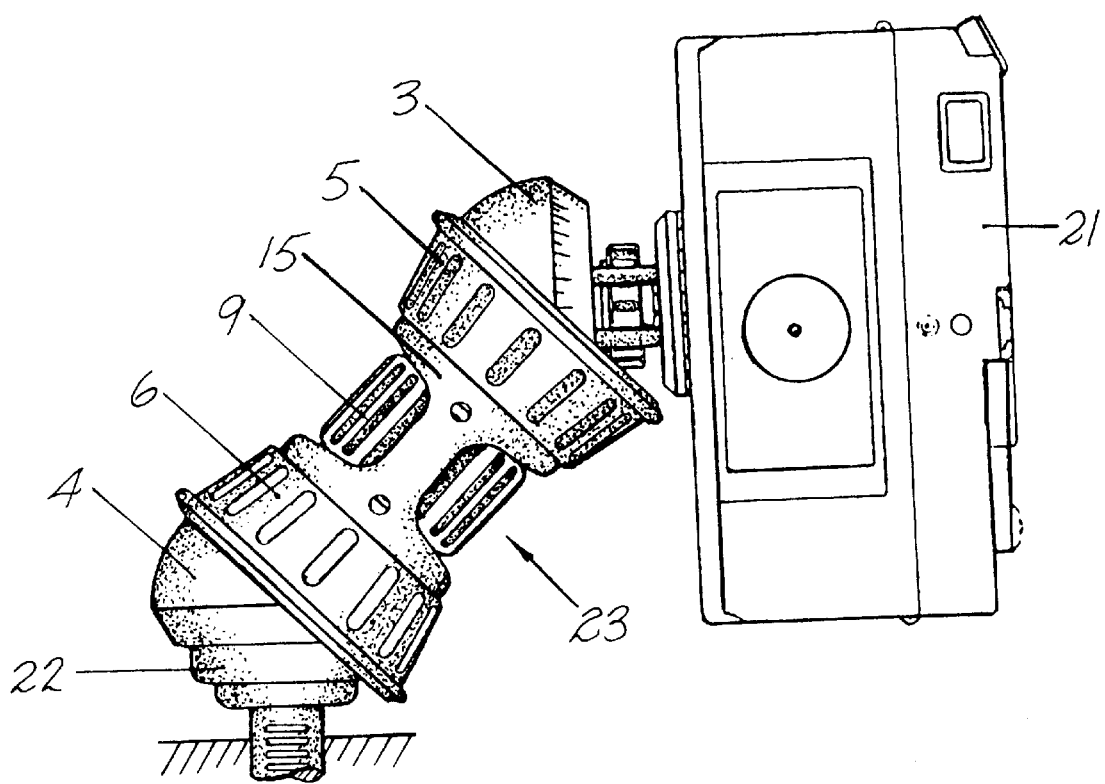
FIG. 5 is a view showing the operating state of the tripod head according to the invention with the platform swaying to right at an angle of 90°.
Figure 6:
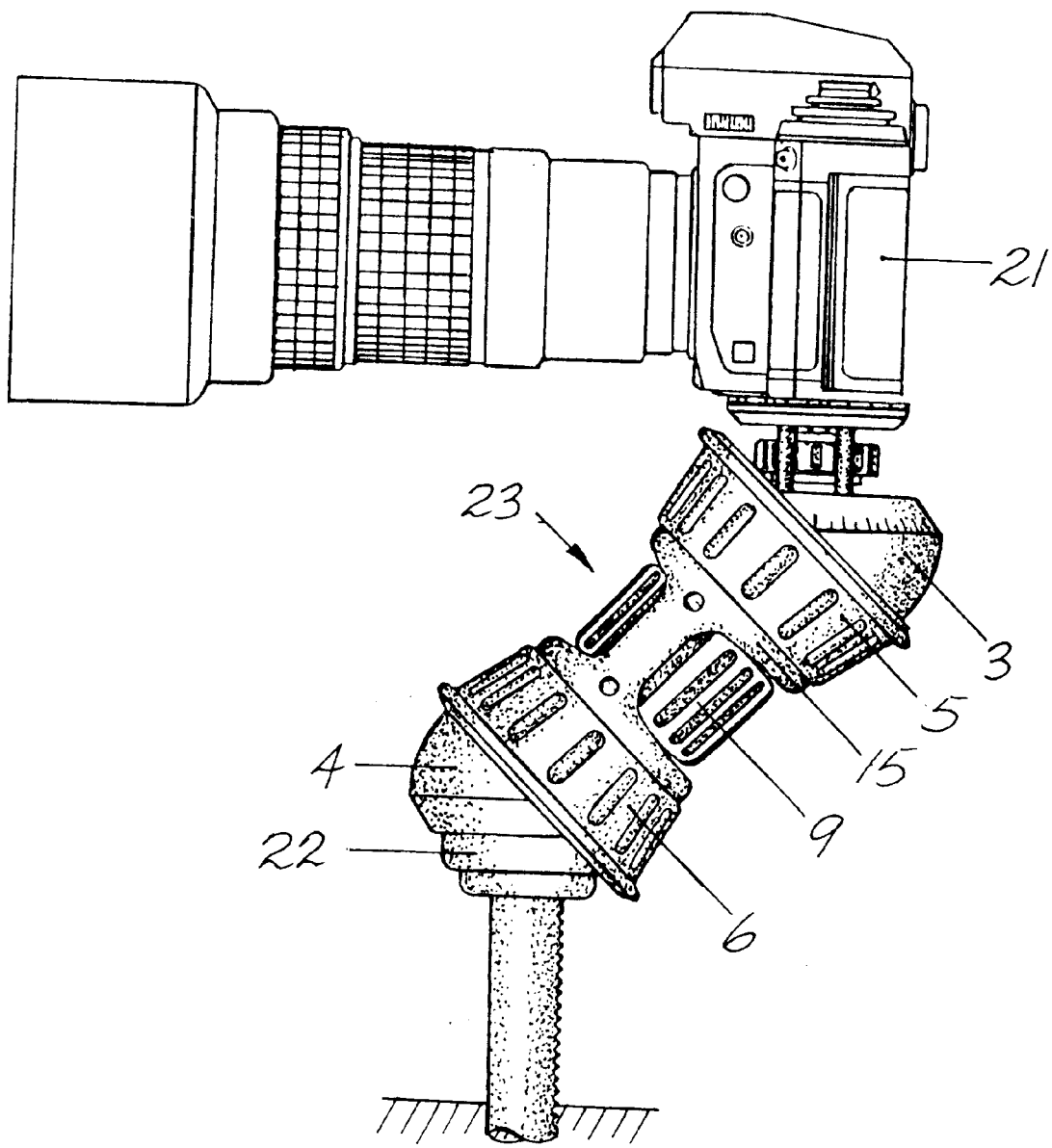
FIG. 6 is a view showing the operating state in which the gravity centre of the platform moves rearwards of the horizontal direction.

In practical operation, tensioning or releasing the upper and lower locking balls 1, 2 by the two rods 7, 8 can be realized by means of slightly turning the controlling handle 9 only with a single hand, thus making the two locking balls move to or away from each other, so as to press together (or release) the convex surfaces of two half-balls 3, 4 to (or from) the concave surfaces of two sockets 5, 6 to obtain a locked or an unlocked state. Therefore, the platform can be rotated or locked in any direction, as shown in FIGS. 4, 5 and 6.

I claim:

1. A half-ball type universally movable tripod head, comprising a base, a platform and a universally positioning means, wherein said universally positioning means comprises upper and lower half-balls, upper and lower sockets, a support stand, a controlling handle, upper and lower locking balls, first and second tension rods having positive and negative threads respectively, and a nut with positive and negative threads at opposite ends; said two sockets being connected together by said support stand and forming two large joints together with said two half-balls; said upper and lower locking balls being located in different ones of said two half-balls and forming rotating centers of said upper and lower half-balls and being connected together by said nut with positive and negative threads at opposite ends and said rods.

2. The half-ball type universally movable tripod head as cited in claim 1, wherein said first and second rods have positive and negative threads respectively are further provided with upper and lower short pins, and upper and lower ball seatings are provided between the upper and lower locking balls and the upper and lower half-balls respectively.

3. The half-ball type universally movable tripod head as cited in claim 1 or 2, wherein said controlling handle is made of wood, nylon or plastics, said upper and lower half-balls are made of Al-alloy, Mg-alloy or nylon materials, and said upper and lower sockets and support stand are made of Al-alloy, Mg-alloy.

* * * * *